United States Patent
Asahi et al.

(10) Patent No.: US 9,777,783 B2
(45) Date of Patent: Oct. 3, 2017

(54) DISK BRAKE FOR VEHICLE

(71) Applicant: NISSIN KOGYO CO., LTD., Ueda-shi, Nagano (JP)

(72) Inventors: Kenji Asahi, Ueda (JP); Takashi Naoi, Ueda (JP); Yoshihiro Yanagisawa, Ueda (JP)

(73) Assignee: NISSIN KOGYO CO., LTD., Ueda-Shi, Nagano (JP)

( * ) Notice: Subject to any disclaimer, the term of this patent is extended or adjusted under 35 U.S.C. 154(b) by 6 days.

(21) Appl. No.: 14/891,980

(22) PCT Filed: Jun. 4, 2014

(86) PCT No.: PCT/JP2014/064841
§ 371 (c)(1),
(2) Date: Nov. 18, 2015

(87) PCT Pub. No.: WO2014/199881
PCT Pub. Date: Dec. 18, 2014

(65) Prior Publication Data
US 2016/0091038 A1 Mar. 31, 2016

(30) Foreign Application Priority Data
Jun. 10, 2013 (JP) ................. 2013-121595

(51) Int. Cl.
*F16D 65/097* (2006.01)
(52) U.S. Cl.
CPC ....... *F16D 65/0977* (2013.01); *F16D 65/097* (2013.01); *F16D 65/0972* (2013.01)
(58) Field of Classification Search
CPC ............... F16D 65/097; F16D 65/0978; F16D 65/0974; F16D 65/0977
See application file for complete search history.

(56) References Cited

U.S. PATENT DOCUMENTS 5,941,348 A 8/1999 Matsumoto et al.
6,003,642 A 12/1999 Mori et al.
(Continued)

FOREIGN PATENT DOCUMENTS

CN 101846147 A 9/2010
JP 10-122278 A 5/1998
(Continued)

OTHER PUBLICATIONS

International Search Report dated Aug. 19, 2014, issued in counterpart International Application No. PCT/JP2014/064841 (1 page).
(Continued)

*Primary Examiner* — Thomas J Williams
*Assistant Examiner* — James Hsiao
(74) *Attorney, Agent, or Firm* — Westerman, Hattori, Daniels & Adrian, LLP (57) ABSTRACT

A disk brake includes a retainer part of a pad retainer provided with an outside section, back section, and inside section. A pad rebounding section is formed by inclining the leading end of a strip, which extends in the disk rotor direction from the end of the inside section away from the disk rotor with an elastic loop section therebetween, toward the outside in the radial direction of the disk. During travel, a gap is formed between the inside section and the strip of the pad rebounding section, and when a lug piece moves inward, the pad rebounding section and the inside section come into contact with each other, the inside section is pressed against an inside surface in the radial direction of the disk, the back section is elastically deformed, and the elastically deformed back section presses the lug piece toward the center side of a caliper body.

1 Claim, 7 Drawing Sheets

(56) References Cited

U.S. PATENT DOCUMENTS

| | | | |
|---|---|---|---|
| 8,397,880 B2* | 3/2013 | Chelaidite | F16D 65/0972 188/73.31 |
| 2007/0251772 A1* | 11/2007 | Tsurumi | F16D 65/095 188/73.38 |
| 2010/0243385 A1* | 9/2010 | Kaneko | F16D 65/0977 188/73.31 |
| 2010/0243389 A1 | 9/2010 | Miura et al. | |
| 2011/0120821 A1* | 5/2011 | Shimamura | F16D 65/0972 188/234 |
| 2011/0127122 A1* | 6/2011 | Suh | F16D 65/095 188/72.4 |
| 2012/0186918 A1* | 7/2012 | Wakabayashi | F16D 65/0972 188/72.3 |
| 2012/0222925 A1* | 9/2012 | Kaneko | F16D 65/0977 188/73.38 |

FOREIGN PATENT DOCUMENTS

| | | |
|---|---|---|
| JP | 2008-286388 A | 11/2008 |
| JP | 2010-230042 A | 10/2010 |
| JP | 2010-230043 A | 10/2010 |
| JP | 2011-52741 A | 3/2011 |
| JP | 4880250 B2 | 2/2012 |

OTHER PUBLICATIONS

Office Action dated Dec. 28, 2016, issued in counterpart Chinese application No. 201480033194.3. (5 pages).

Extended (Supplementary) European Search Report dated Jan. 13, 2017, issued in counterpart European application No. 14811025.7. (5 pages).

\* cited by examiner

DISK BRAKE FOR VEHICLE

TECHNICAL FIELD

The present invention relates to a disk brake for a vehicle used for vehicles such as an automobile and motorcycle and, more particularly, to the structure of a pad retainer that is disposed in the pad guide groove of a caliper support arm to support the lug pieces of the back plate of a friction pad.

BACKGROUND ART

In a conventional disk brake for a vehicle in which the lug pieces projecting from both sides of the back plate of a friction pad are supported in a pad guide groove formed in the caliper support arm of a caliper bracket and the friction pad is attached movably in the disk shaft direction, the pad retainer formed by a metal thin plate is disposed between the pad guide groove and the lug pieces to prevent the generation of abnormal sounds.

As this type of pad retainer, there is a pad retainer, on the turn-in side of the disk brake during forward travel of the vehicle, that has an elastically pressing section coming into contact with the end surface on the disk turn-in side of the lug pieces of the friction pad and pressing the friction pad against the disk turn-out side. The pad retainer suppresses the rattling of the friction pad by pressing the friction pad against the disk turn-out side (see PTL 1, for example).

CITATION LIST

Patent Literature

PTL 1: Japanese Patent No. 4880250

SUMMARY OF INVENTION

Technical Problem

However, in the technique in the PTL above, the pad retainer always biases the friction pad toward the disk turn-out side and the friction pad is pressed against the disk turn-out side, so the friction pad does not easily return to the initial position when braking is released and the friction pad may be dragged by the disk rotor.

An object of the invention is to provide a disk brake for a vehicle that can prevent the occurrence of clunking noise (collision noise) by suppressing the rattling of the friction pad while preventing the friction pad from being dragged.

Solution to Problem

To achieve the above object, a disk brake for a vehicle according to the present invention includes a caliper bracket to be secured to a vehicle body, the caliper bracket having a pair of caliper support arms striding an outer edge of the disk rotor in a disk shaft direction, the pair of caliper support arms extending along the caliper bracket, the pair of caliper support arms having U-shaped pad guide grooves formed by an outside surface in a radial direction of a disk, an inside surface in the radial direction of the disk, and a facing surface connecting the outside surface and the inside surface, the U-shaped pad guide grooves being provided so as to face each other, a disk rotor, a pad retainer, and a pair of friction pads disposed so as to sandwich the disk rotor, the pair of friction pads each having a lug piece projecting from both sides of a back plate of each of the pair of friction pads, the lug piece being supported in the pad guide groove via the pad retainer, the pad retainer including a pair of retainer parts mounted in the pad guide grooves on both sides of the disk rotor, a coupling piece connecting the pair of retainer parts while striding the outer edge of the disk rotor, and a pad rebounding section biasing the lug piece toward the outside in the radial direction of the disk rotor, in which the retainer parts each include an outside section disposed along the outside surface in the radial direction of the disk of the pad guide groove, a back section disposed along the facing surface, and an inside section provided so as to be inclined from the inside end sections in the radial direction of the disk of the back section toward the outside in the radial direction of the disk of the back section, the pad rebounding section is formed by inclining a leading end of a stripe extending toward the disk rotor via an elastic loop section bent like an arc toward the outside in the radial direction of the disk, the elastic loop section extending from an end of the inside section away from the disk rotor, toward the outside in the radial direction of the disk, the lug piece is biased by the pad rebounding section toward the outside in the radial direction of the disk during travel of a vehicle, the lug piece being disposed in the pad guide groove with a gap provided between the inside section and the pad rebounding section, and, when the lug piece moves toward the inside in the radial direction of the disk, the pad rebounding section comes into contact with the inside section, the inside section is pressed against the inside surface in the radial direction of the disk, the back section is elastically deformed so as to warp toward the lug piece, and the lug piece is pressed toward a center of the friction pad by the elastically deformed back section.

Advantageous Effects of Invention

In the disk brake for a vehicle according to the invention, during travel of the vehicle, the pad rebounding section biases the lug pieces toward the outside in the radial direction of the disk, the rattling of the friction pad is suppressed, and a gap is formed between the pad rebounding section and the inside section. During braking, the lug pieces move toward the disk rotor while deforming the pad rebounding section toward the inside section. During releasing of braking, since the elastic loop section and the pad rebounding section attempt to return to the initial state, the lug pieces is biased away from the disk rotor and the friction pad is pulled back away from the disk rotor to prevent the friction pad from being dragged.

In addition, when the vehicle undergoes larger vibrations due to the unevenness of the road surface and the friction pad moves toward the inside in the radial direction of the disk, the lug pieces move toward the inside in the radial direction of the disk, the pad rebounding section comes into contact with the inside section, the inside section is pressed against the inside surface in the radial direction of the disk of the pad guide groove, and the back section is elastically deformed toward the lug pieces. This causes the back section to press both lug pieces toward the center of the friction pad, suppresses the rattling of the friction pad, and prevents the generation of clunking noise.

DESCRIPTION OF EMBODIMENTS

FIGS. 1 to 7 illustrate a disk brake for a vehicle according to an embodiment of the present invention. Arrow A indicates the rotational direction of the disk rotor rotating together with the front wheel when the vehicle moves forward and the disk turn-out side and the disk turn-in side described below assume the forward movement of the vehicle.

This disk brake 1 for a vehicle includes a disk rotor 2 rotating together with the wheel, a caliper bracket 3 to be secured to the vehicle body beside the disk rotor 2, a caliper body 5 supported movably in the disk shaft direction via a pair of slide pins 4 and 4 by caliper support arms 3a and 3a of the caliper bracket 3, and a pair of friction pads 6 and 6 disposed so as to face each other across the disk rotor 2.

The caliper body 5 includes an action section 5a and a reaction section 5b disposed on both sides of the disk rotor 2 and a bridge section 5c coupling the action section 5a and the reaction section 5b by striding the outer edge of the disk rotor 2 and the action section 5a is provided with a cylinder hole 5d having an opening at the end close to the disk rotor 2. The cylinder hole 5d accommodates a piston 7 having a bottomed cylindrical shape, and the piston 7 moves in the cylinder hole 5d toward the disk rotor by receiving the hydraulic pressure supplied to a hydraulic chamber 8 at the bottom of the cylinder hole. In addition, vehicle body mounting arms 5e and 5e project from both sides in the disk rotational direction of the action section 5a and the slide pin 4 projects from the end of the vehicle body mounting arm 5e via mounting bolt 9.

The caliper support arms 3a and 3a stride the outer edge of the disk rotor 2 in the disk shaft direction while sandwiching both sides of the bridge section 5c from both sides in the disk rotational direction of the caliper bracket 3 and, on the other side of the disk rotor 2, extend toward the center of disk along the side wall of the reaction section 5b. In addition, the ends of the caliper support arms 3a and 3a are coupled by a tie rod 3b to improve the stiffness of both support arms 3a and 3a to which a braking torque is applied.

A guide hole 3c for accommodating the slide pin 4 is bored in the caliper support arm 3a and both caliper support arms 3a and 3a are provided with four pad guide grooves 3d and 3d, which face each other beside the disk rotor 2. The pad guide groove 3d is formed in a U-shape by an outside surface 3e in the radial direction of the disk, an inside surface 3f in the radial direction of the disk, and a facing surface 3g connecting the outside surface 3e and the inside surface 3f. The friction pad 6 has lug pieces 6b and 6b projecting from both sides of a back plate 6a and the lug pieces 6b and 6b are supported via pad retainers 10 in the pad guide grooves 3d and 3d on the disk turn-in side and the disk turn-out side. On the outside in the radial direction of the disk of the pad guide grooves 3d and 3d, there are pad retainer mounting sections 3i and 3i each having a mounting surface 3h disposed parallel to the outside surface 3e in the radial direction of the disk.

In the friction pad 6, the lug piece 6b and 6b project from both sides of the back plate 6a and a lining 6c is pasted on one side surface of the back plate 6a. The lug piece 6b is formed in a substantially rectangular shape that can be inserted into the pad guide groove 3d and the lug piece 6b has the outside surface 6d in the radial direction of the disk, the inside surface 6e in the radial direction of the disk, and an outer end surface 6f in the rotational direction of the disk.

The above pad retainer 10 includes a pair of retainer parts 10a and 10a mounted in the pad guide grooves 3d and 3d on both sides of the disk rotor on the disk turn-in side or the disk turn-out side, pad rebounding sections 10c and 10c extending toward the disk rotor via elastic loop sections 10b and 10b provided at the ends of the retainer parts 10a and 10a away from the disk rotor, mounting pieces 10d and 10d coming into contact with the mounting surface 3h of the pad retainer mounting sections 3i and 3i of the caliper support arm 3a, and a coupling piece 10e coupling the upper parts of the mounting pieces 10d and 10d by striding the outer edge of the disk rotor 2.

The retainer part 10a includes an inside section 10f and an outside section 10g that face toward the inside and the outside in the radial direction of the disk across the lug piece 6b of the friction pad 6, and a back section 10h coupling the inside section 10f and the outside section 10g in the back part of the pad guide grooves 3d and 3d. The outside section 10g and the back section 10h are coupled orthogonally to each other. The inside section 10f is provided so as to be inclined from the inside end of the back section 10h in the radial direction of the disk toward the outside in the radial direction of the disk and the inside section 10f has a rib 10i projecting toward the outside in the radial direction of the disk and supporting the pad rebounding section 10c. The rib 10i is provided in parallel to the disk shaft and has the same projection height over the entire length. In addition, insertion guide sections 10j are provided so as to bend outward at the ends of the outside section 10g and 10g and the ends of the back section 10h and 10h away from the disk rotor, so that the lug piece 6b of the friction pad 6 can be easily inserted. In addition, a positioning section 10k coming into contact with the surface of the caliper support arm 3a close to the disk rotor is provided in the end of the back section 10h close to the disk rotor.

The elastic loop section 10b is formed by bending a stripe extending in the direction away from the disk rotor from the inside section 10f like an arc extending from the outside in the radial direction of the disk toward the disk rotor and the end part of the stripe extending from the bent end of the elastic loop section 10b toward the disk rotor is the pad rebounding section 10c. The pad rebounding section 10c has a length equivalent to the distance by which the lug piece 6b of the friction pad 6 moves from when the lining 6c is new until the lining 6c fully wears, is formed so as to be gradually inclined toward the outside in the radial direction of the disk, and is formed so as to warp back like a bow along the extending direction.

The mounting piece 10d is formed so as to be elastically deformable by performing bending from the end of the outside section 10g along the end surface of the pad retainer mounting section 3i so as to extend toward the outside surface in the radial direction of the disk of the pad retainer mounting section 3i, such that the pad retainer mounting section 3i is sandwiched between the mounting piece 10d elastically deformed outward and the outside section 10g.

The pad retainer 10 formed in this way is attached to the caliper support arm 3a by inserting the mounting piece 10d and the outside section 10g onto the pad retainer mounting section 3i. In this case, the pad retainer 10 is mounted with the outside sections 10g of the retainer parts 10a coming into contact with the outside surfaces 3e in the radial direction of the disk of the pad guide grooves 3d and the base ends of the inside sections 10f coming into contact with the back sides of the inside surfaces 3f in the radial direction of the disk of the pad guide grooves 3d. In addition, the elastic loop sections 10b are disposed in the ends of the caliper support arms 3a away from the disk rotor and the pad rebounding sections 10c are disposed while gradually warping toward the outside surface 3e in the radial direction of the disk of the pad guide grooves, from the elastic loop section 10b toward the disk rotor.

Figure 1:
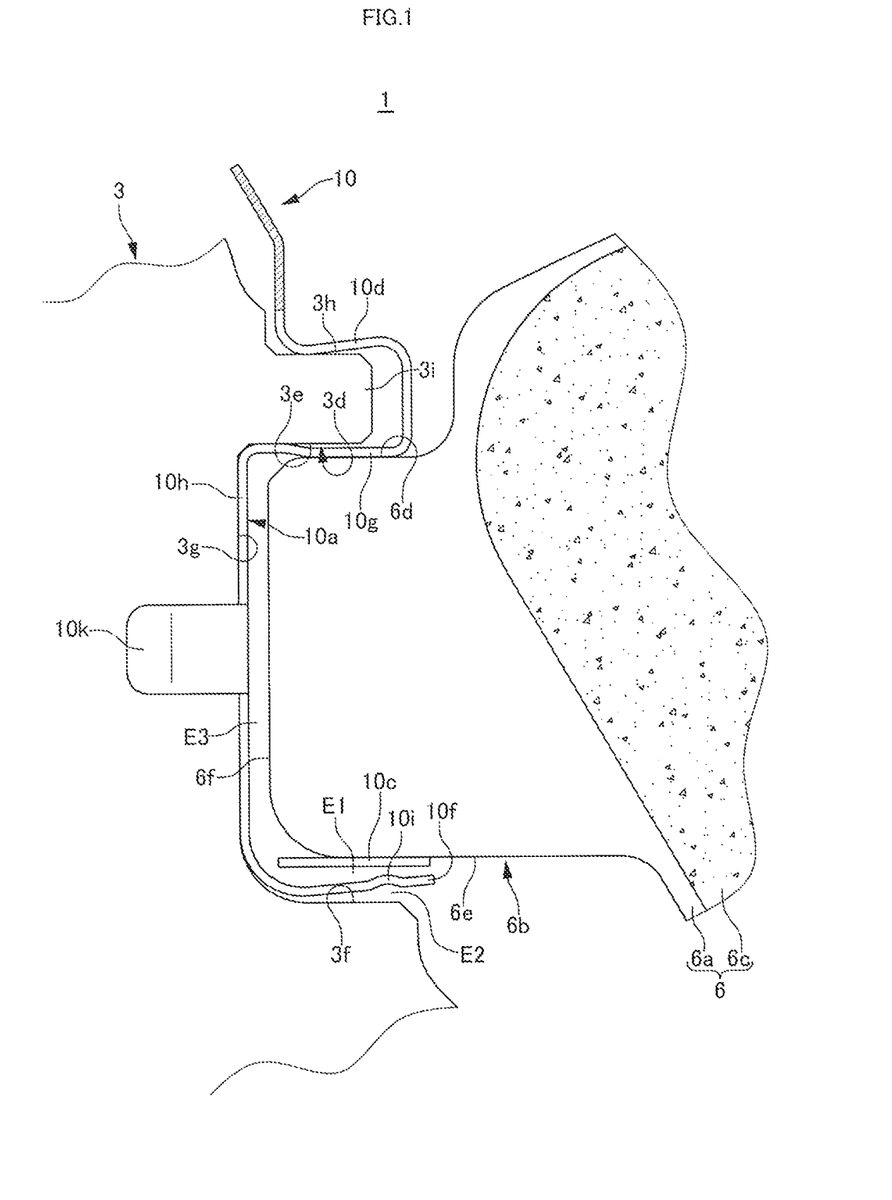
FIG. 1 is an enlarged view illustrating the key part of a disk brake for a vehicle according to an embodiment of the present invention.

The friction pads 6 are mounted with the lug pieces 6b and 6b of the back plate 6a inserted into the pad guide grooves 3d and 3d on the disk turn-in and turn-out sides, the outside surfaces in the radial direction of the disk of the lug pieces 6b and 6b coming into contact with the outside sections 10g and 10g of the retainer parts 10a and 10a, and the inside surfaces 6d and 6d in the radial direction of the disk of the lug pieces 6b and 6b coming into contact with the pad rebounding sections 10c and 10c. Accordingly, in the inside sections 10f and 10f and the pad rebounding sections 10c and 10c, as illustrated in FIG. 1, gaps E1 are formed between the ribs 10i and 10i and the pad rebounding sections 10c and 10c and gaps E2 are formed between the parts of the inside sections 10f and 10f excluding the base ends and the inside surface 3f in the radial direction of the disk of the pad guide grooves 3d. In addition, a very small gap E3 is provided between the outer end surface 6f in the rotational direction of the disk of at least one of the lug pieces 6b and 6b and the back section 10h. This mounting disposes the elastic loop sections 10b and 10b at the ends of the lug pieces 6b and 6b away from the disk rotor and prevents the dropping of the friction pad 6.

The embodiment is formed as described above and, when the pressurized operating fluid is supplied to the hydraulic chamber 8 through the braking operation by the driver, the piston 7 moves forward in the cylinder hole 5d and presses the friction pad 6 close to the action section 5a against one side surface of the disk rotor 2. Next, the caliper body 5 receives the reaction force and moves toward the action section 5a while being guided by slide pins 4 and 4, and a reaction force claw 5f presses the friction pad 6 close to the reaction section 5b against the other side surface of the disk rotor 2.

At this time, in the friction pad 6, the outside surfaces 6d and 6d in the radial direction of the disk of the lug pieces 6b and 6b are guided by the outside sections 10g and 10g of the retainer parts 10a and 10a, the inside surfaces 6e and 6e in the radial direction of the disk of the lug pieces 6b and 6b move smoothly in the pad guide grooves 3d and 3d while pressing the pad rebounding sections 10c and 10c toward the inside sections 10f and 10f, and there is a very small gap E3 between the outer end surface 6f in the rotational direction of the disk of at least one of the lug pieces 6b and 6b and the back section 10h, so the sliding resistance can be reduced. In addition, the pad rebounding sections 10c and 10c are biased toward the inside sections 10f and 10f by the lug pieces 6b and 6b, but the inside surfaces 6e and 6e in the radial direction of the disk of the lug pieces 6b and 6b are pressed toward the outside surfaces 3e and 3e in the radial direction of the disk of the pad guide grooves 3d and 3d by the elastic force by the elastic loop sections 10b and 10b and the pad rebounding sections 10c and 10c. Accordingly, the outside surfaces 6d and 6d in the radial direction of the disk of the lug pieces 6b and 6b are always pressed against the outside surfaces 3e and 3e in the radial direction of the disk of the pad guide grooves 3d and 3d via the outside sections 10g and 10g of the pad retainer 10, so the lug pieces 6b and 6b do not rattle in the pad guide grooves 3d and 3d during braking and occurrence of clunking noise can be prevented.

On the other hand, when braking is released and the piston 7 and the reaction force claw 5f are retracted to the initial positions, since the elastic loop sections 10b and 10b and the pad rebounding sections 10c and 10c attempt to return to the initial shapes, the lug pieces 6b and 6b in contact with the pad rebounding sections 10c and 10c are pressed away from the disk rotor and the friction pads 6 are forced to move away from the side surface of the disk rotor 2. This prevents the friction pads 6 from being dragged, suppresses judder caused by wear of the disk rotor 2, and suppresses brake noise.

Figure 2:
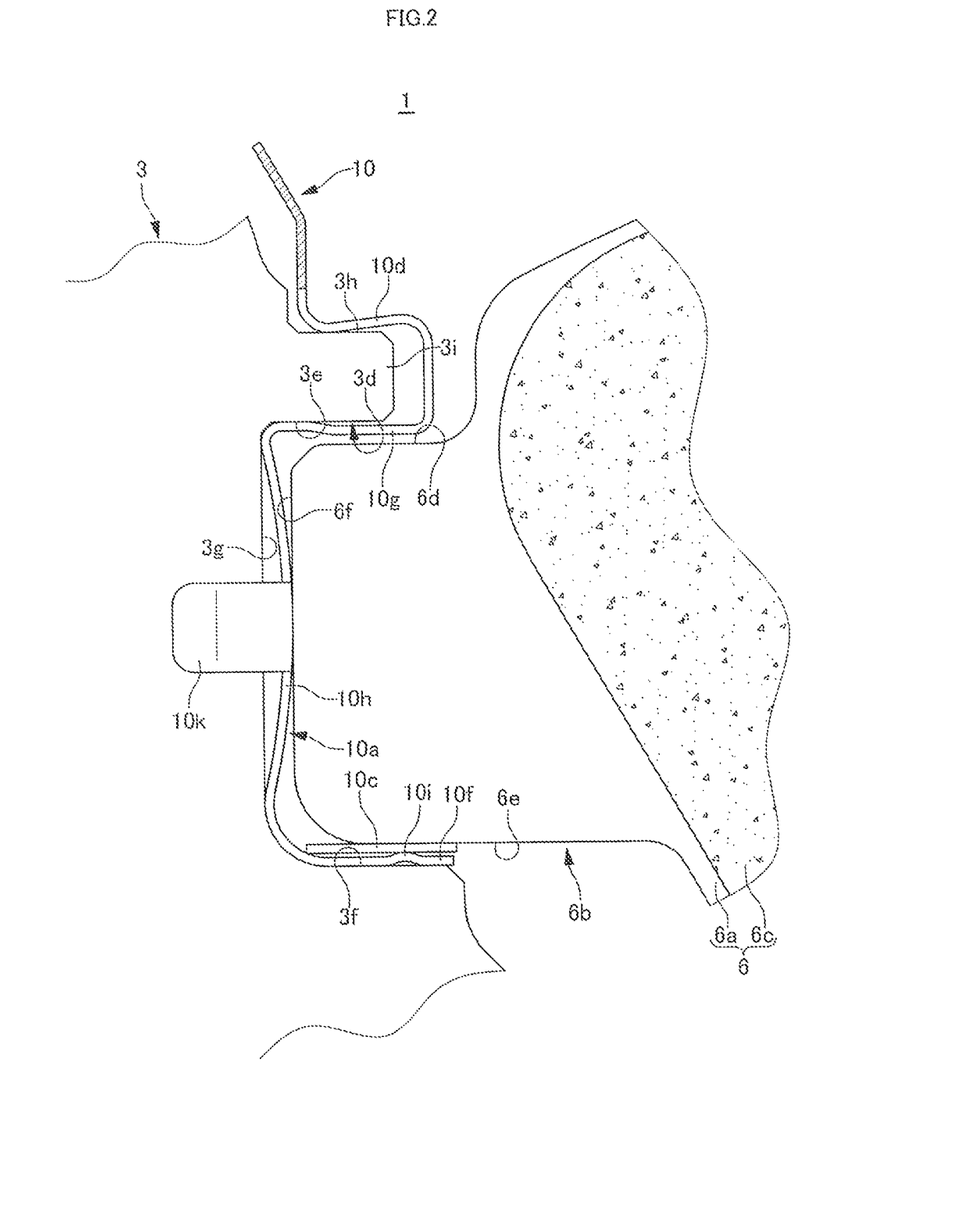
FIG. 2 is an enlarged view illustrating the key part of the disk brake for a vehicle when the vehicle body undergoes vibrations larger than usual.
Figure 3:
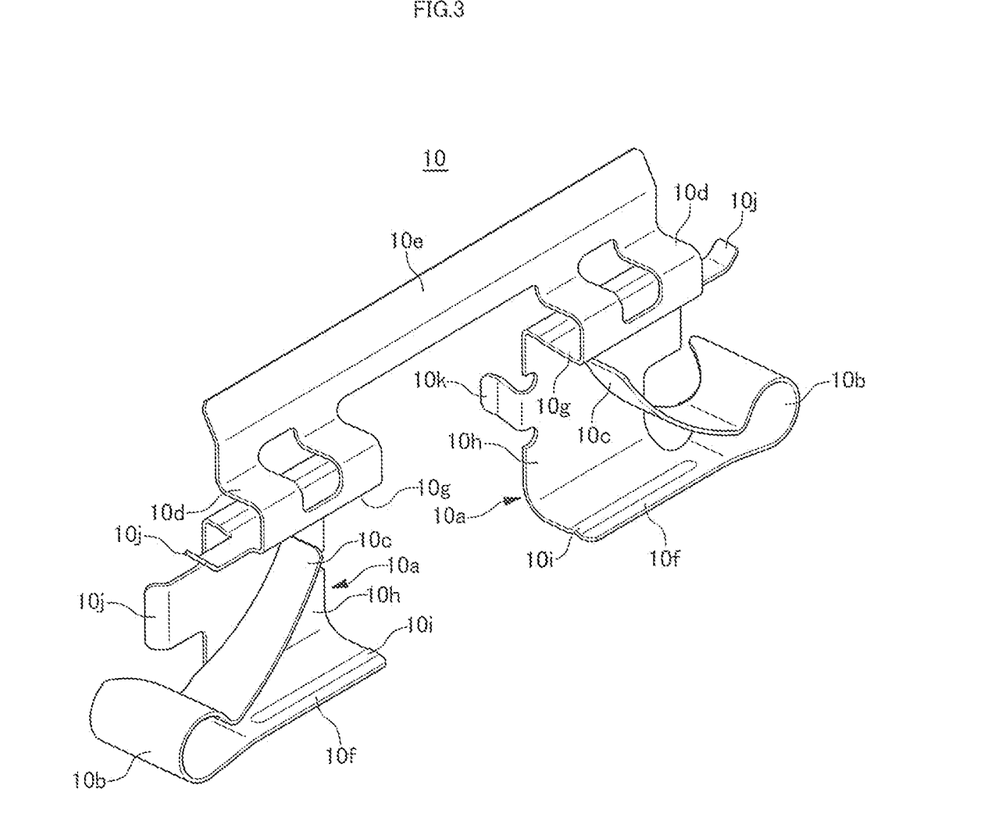
FIG. 3 is a perspective view illustrating a pad retainer.
Figure 4:
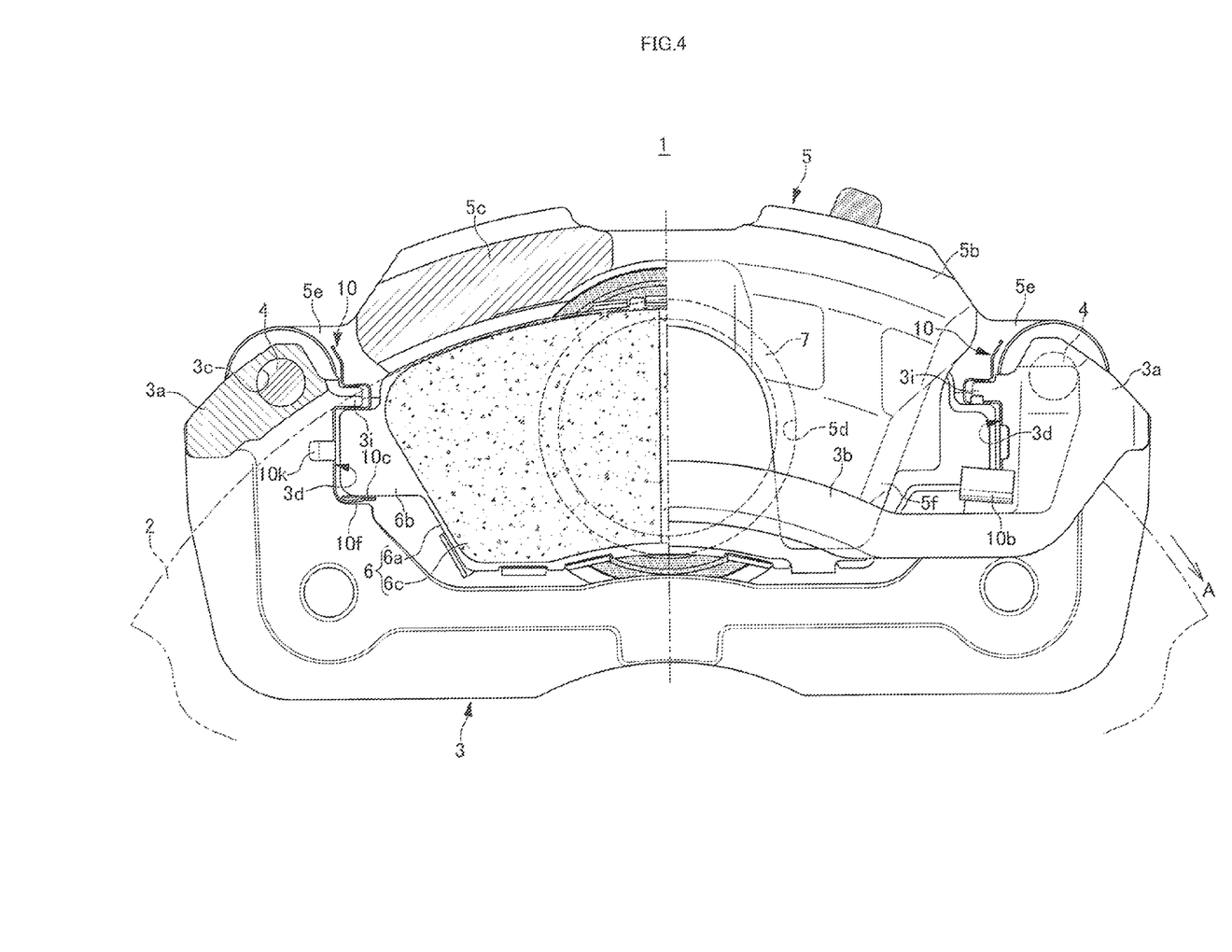
FIG. 4 is a partial cross sectional view of the rear of the disk brake for a vehicle.
Figure 5:
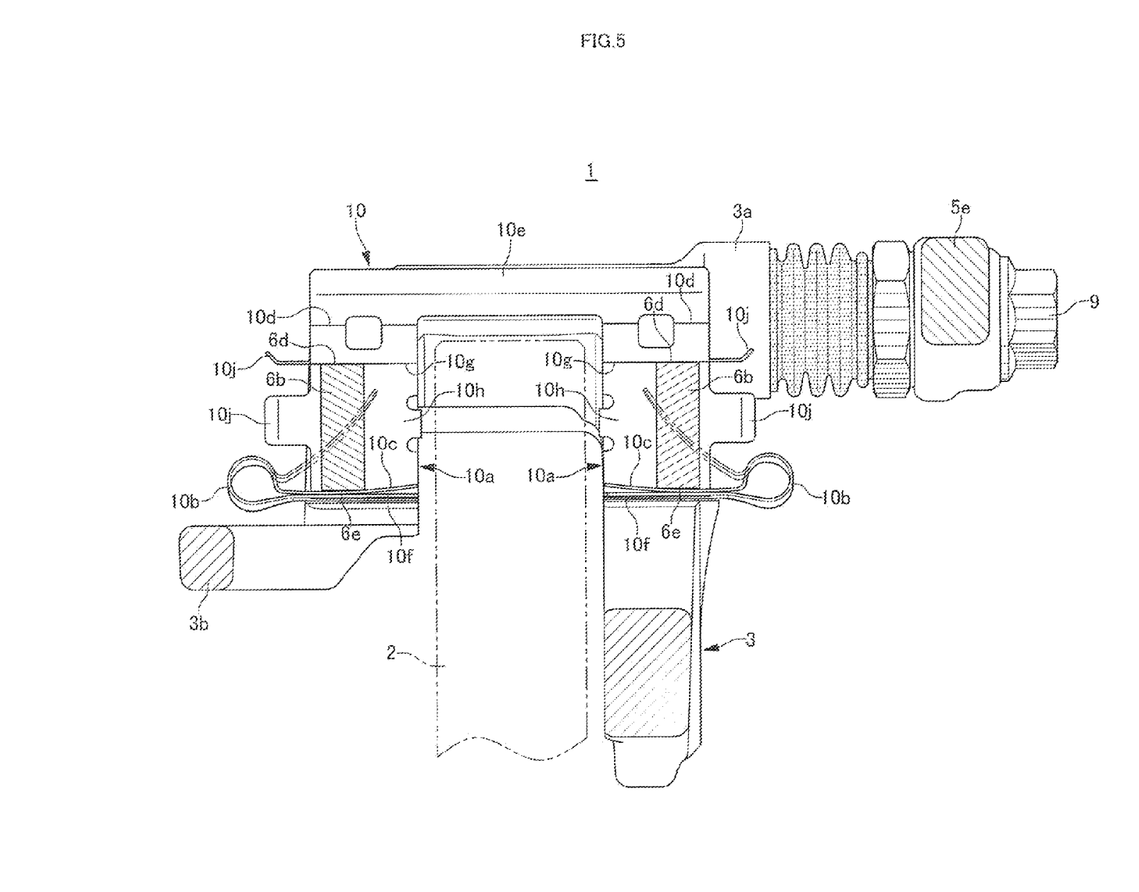
FIG. 5 is a cross sectional view illustrating cross section V-V in FIG. 4.
Figure 6:
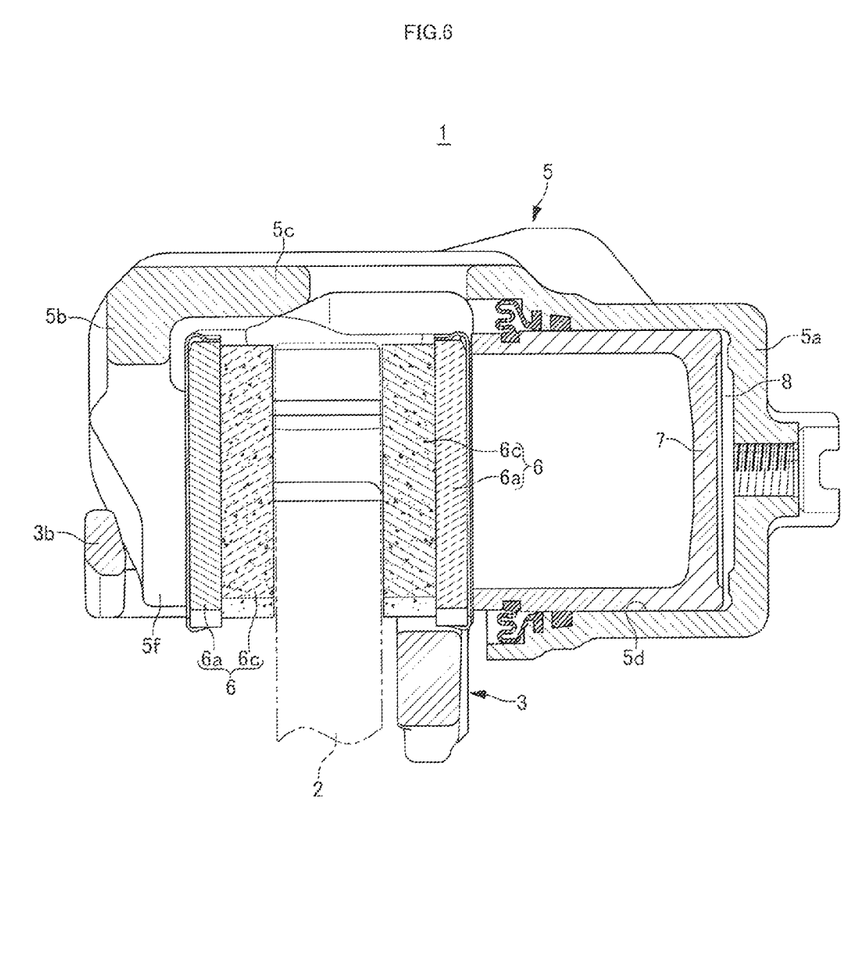
FIG. 6 is a cross sectional view illustrating cross section VI-VI in FIG. 4.
Figure 7:
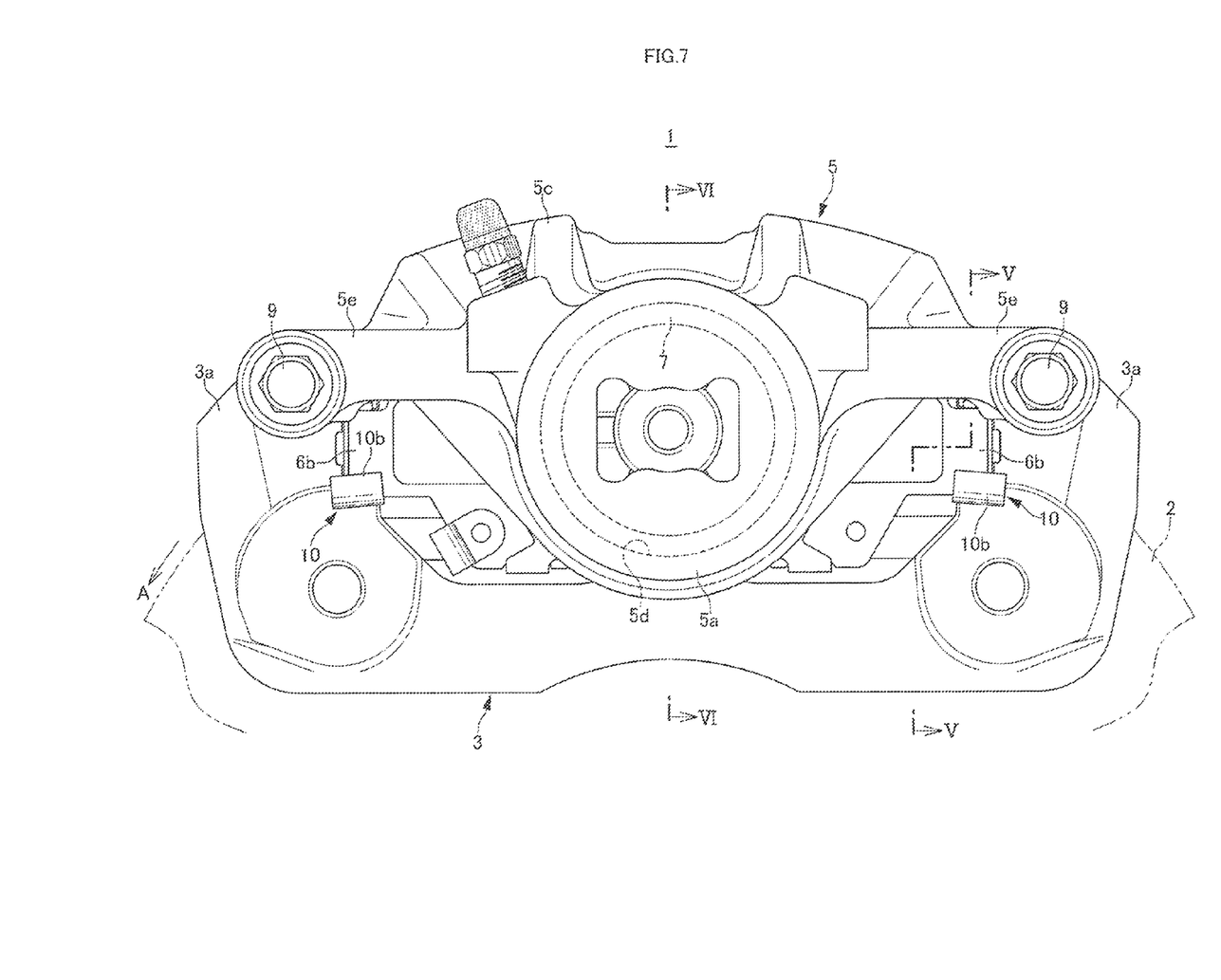
FIG. 7 is a front view illustrating the disk brake for a vehicle.

In addition, when the vehicle undergoes larger vibrations due to the unevenness of the road surface, the friction pad 6 moves toward the inside in the radial direction of the disk rotor temporarily against the biasing force by the pad rebounding sections 10c and 10c and, as illustrated in FIG. 2, the pad rebounding sections 10c and 10c come into contact with the inside sections 10f and 10f, the inside sections 10f and 10f are pressed against the inside surfaces 3f and 3f in the radial direction of the disk of the pad guide grooves 3d and 3d, and the back sections 10h and 10h are thereby elastically deformed so as to warp toward the lug pieces. With this, the elastically deformed back sections 10h and 10h press the outer end surfaces 6f and 6f in the rotational direction of the disk of the lug pieces 6b and 6b toward the center of the friction pad 6, thereby suppressing the rattling of the friction pad 6 and preventing the generation of clunking noise.

The invention is not limited to the above embodiment and the rib does not need to be formed on the inside section of the pad retainer. In addition, the shapes of the coupling piece and mounting piece of the pad retainer and the shapes and the number of insertion guide sections and positioning section are arbitrary. In addition, the sizes of the gaps E1, E2, and E3 between the lug piece and the pad retainer in FIGS. 1 and 2 are shown for explanation of elastic deformation of the pad retainer and the gaps are actually very small.

REFERENCE SIGNS LIST

1: disk brake for a vehicle
2: disk rotor
3: caliper bracket
3a: caliper support arm
3b: tie rod
3c: guide hole
3d: pad guide groove
3e: outside surface in the radial direction of disk
3f: inside surface in the radial direction of disk
3g: facing surface
3h: mounting surface
3i: pad retainer mounting section
4: slide pin
5: caliper body
5a: action section
5b: reaction section
5c: bridge section
5d: cylinder hole 5*e*: vehicle body mounting arm
5*f*: reaction force claw
6: friction pad, 6*a*: back plate
6*b*: lug piece
6*c*: lining
6*d*: outside surface in the radial direction of disk
6*e*: inside surface in the radial direction of disk
6*f*: outer end surface in the rotational direction of disk
7: piston
8: hydraulic chamber
9: mounting bolt
10: pad retainer
10*a*: retainer part
10*b*: elastic loop section
10*c*: pad rebounding section
10*d*: mounting piece
10*e*: coupling piece
10*f*: inside section
10*g*: outside section
10*h*: back section
10*i*: rib
10*j*: insertion guide section
10*k*: positioning section

The invention claimed is:

1. A disk brake for a vehicle, comprising:
a disk rotor;
a caliper bracket to be secured to a vehicle body, the caliper bracket having a pair of caliper support arms striding an outer edge of the disk rotor in a disk shaft direction, the pair of caliper support arms extending along the caliper bracket, the pair of caliper support arms having U-shaped pad guide grooves formed by an outside surface in a radial direction of a disk, an inside surface in the radial direction of the disk, and a facing surface connecting the outside surface and the inside surface, the U-shaped pad guide grooves being provided so as to face each other;
a pad retainer; and
a pair of friction pads disposed so as to sandwich the disk rotor, the pair of friction pads each having a lug piece projecting from both sides of a back plate of each of the pair of friction pads, the lug piece being supported in the pad guide groove via the pad retainer, wherein the pad retainer includes a pair of retainer parts mounted in the pad guide grooves on both sides of the disk rotor, a coupling piece connecting the pair of retainer parts while striding the outer edge of the disk rotor, and a pad rebounding section biasing the lug piece toward the outside in the radial direction of the disk rotor, the retainer parts each include an outside section disposed along the outside surface in the radial direction of the disk of the pad guide groove, a back section disposed along the facing surface, and an inside section provided so as to be inclined from inside end sections in the radial direction of the disk of the back section toward the outside in the radial direction of the disk of the back section, the pad rebounding section is formed by inclining a leading end of a stripe extending toward the disk rotor via an elastic loop section bent like an arc toward the outside in the radial direction of the disk, the elastic loop section extending from an end of the inside section away from the disk rotor, toward the outside in the radial direction of the disk, the lug piece is biased by the pad rebounding section toward the outside in the radial direction of the disk during travel of a vehicle, the lug piece being disposed in the pad guide groove with a gap provided between the inside section and the pad rebounding section, and when the lug piece moves toward the inside in the radial direction of the disk, the pad rebounding section comes into contact with the inside section, the inside section is pressed against the inside surface in the radial direction of the disk, the back section is elastically deformed so as to warp toward the lug piece, and the lug piece is pressed toward a center of the friction pad by the elastically deformed back section.

* * * * *